US008745350B2

(12) United States Patent
Lehr et al.

(10) Patent No.: US 8,745,350 B2
(45) Date of Patent: *Jun. 3, 2014

(54) TEMPORARY VTOC LOCKING DURING DEFRAGMENTATION

(71) Applicant: International Business Machines Corporation, Armonk, NY (US)

(72) Inventors: Douglas L. Lehr, Tucson, AZ (US); Franklin E. McCune, Tucson, AZ (US); David C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/862,672

(22) Filed: Apr. 15, 2013

(65) Prior Publication Data

US 2013/0227234 A1  Aug. 29, 2013

Related U.S. Application Data

(63) Continuation of application No. 12/916,312, filed on Oct. 29, 2010, now Pat. No. 8,438,355.

(51) Int. Cl.
| G06F 12/00 | (2006.01) |
| G06F 13/00 | (2006.01) |
| G06F 13/28 | (2006.01) |
| G06F 7/00  | (2006.01) |
| G06F 17/00 | (2006.01) |

(52) U.S. Cl.
USPC .............................. 711/165; 711/170; 707/693

(58) Field of Classification Search
USPC .................................... 711/165, 170; 707/693
See application file for complete search history.

(56) References Cited

U.S. PATENT DOCUMENTS

| 6,205,529 B1 | 3/2001 | Shagam |
| 7,519,639 B2 | 4/2009 | Bacon et al. |
| 2001/0047451 A1 | 11/2001 | Noble et al. |
| 2004/0148476 A1 | 7/2004 | Altare |
| 2005/0210214 A1 | 9/2005 | Takase et al. |
| 2008/0109599 A1 | 5/2008 | Smith |
| 2008/0270742 A1 | 10/2008 | Huang et al. |
| 2009/0281983 A1 | 11/2009 | Cowden et al. |
| 2010/0100701 A1 | 4/2010 | Kusters et al. |
| 2010/0180093 A1 | 7/2010 | Huber et al. |

FOREIGN PATENT DOCUMENTS

| JP | 3044745 A | 2/1991 |
| JP | 8006732 A | 1/1996 |

*Primary Examiner* — Ryan Bertram
(74) *Attorney, Agent, or Firm* — Griffiths & Seaton PLLC

(57) ABSTRACT

Various embodiments for defragmentation of a storage volume in a computing storage environment by a processor device are provided. A volume table of contents (VTOC) is serialized for a volume scan operation. At least one dummy data set in the storage volume is allocated, to be subsequently filled with actual data pursuant to a degragmentation operation. Input/output (I/O) operations are allowed to occur.

23 Claims, 3 Drawing Sheets

TEMPORARY VTOC LOCKING DURING DEFRAGMENTATION

CROSS-REFERENCE TO RELATED APPLICATIONS

This application is a Continuation of U.S. patent application Ser. No. 12/916,312, filed on Oct. 29, 2010, the contents of which are incorporated herein by reference.

BACKGROUND OF THE INVENTION

1. Field of the Invention

The present invention relates in general to computers, and more particularly to a method, system, and computer program product for optimizing defragmentation operations by temporarily VTOC locking in a computing storage environment.

2. Description of the Related Art

The majority of businesses in the world today use computers and computer operating systems to store and manage information. Typically, such information is stored and managed in interconnected storage systems. In today's current environment, data sets are constantly expanded and compressed, resulting in fragmentation in storage units (such as volumes). The most common solution to reducing such fragmentation is implementing a defragmentation operation, or "DEFRAG" job. DEFRAG may pass through an entire volume, moving datasets together so that the disk's free space is grouped together. Several passes are often required to defragment a volume.

SUMMARY OF THE INVENTION

Currently, DEFRAG jobs lock access to the volume table of contents (VTOC) for the duration of the DEFRAG. This can cause disruption on high use production volumes since the data sets may not be able to be extended, allocated or accessed while the job is running This problem becomes even worse with the addition of extended addressable volumes that are significantly larger. Today with DEFRAG jobs, the VTOC serialized and scanned to determine what tracks need to be moved. Data is then moved and a pass is complete. The volume is then analyzed again and a subsequent pass begins. This multiple pass logic can have many iterations before the volume is defragged.

During the DEFRAG, data sets to be moved are enqueued (ENQed), and the VTOC is reserved for the duration of the DEFRAG of the volume. The ENQ of the data set being moved prevents those data sets from being read or updated. The VTOC reserve prevents other jobs from accessing the VTOC. This can prevent data set extends, new allocations, or other requests from completing.

In view of the foregoing, a need exists for a mechanism where by DEFRAG operations may be optimized for a particular storage volume by minimizing the VTOC reserve time. Accordingly, various embodiments for defragmentation of a storage volume in a computing storage environment by a processor device are provided. In one such embodiment, by way of example only, a volume table of contents (VTOC) is serialized for a volume scan operation. At least one dummy data set in the storage volume is allocated, to be subsequently filled with actual data pursuant to a degragmentation operation. The serialization of the VTOC is released, allowing access to the storage volume. Input/output (I/O) operations are allowed to occur.

Additional system and computer program product embodiments are provided and provide related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The present description and claimed subject matter describe exemplary system, method, and computer program product embodiments for optimizing storage unit (again, such as volume) defragmentation operations as previously described. These embodiments add an additional level of analysis, which uses a series of dummy allocations on the volume to reserve target areas. When a determination is made pursuant to the analysis of what data should be moved, and the dummy allocations are complete, the VTOC reserve is dropped. All other empty portions of the volume are then accessible for new data allocations or extends of data sets that are not being moved by the DEFRAG.

Figure 1:
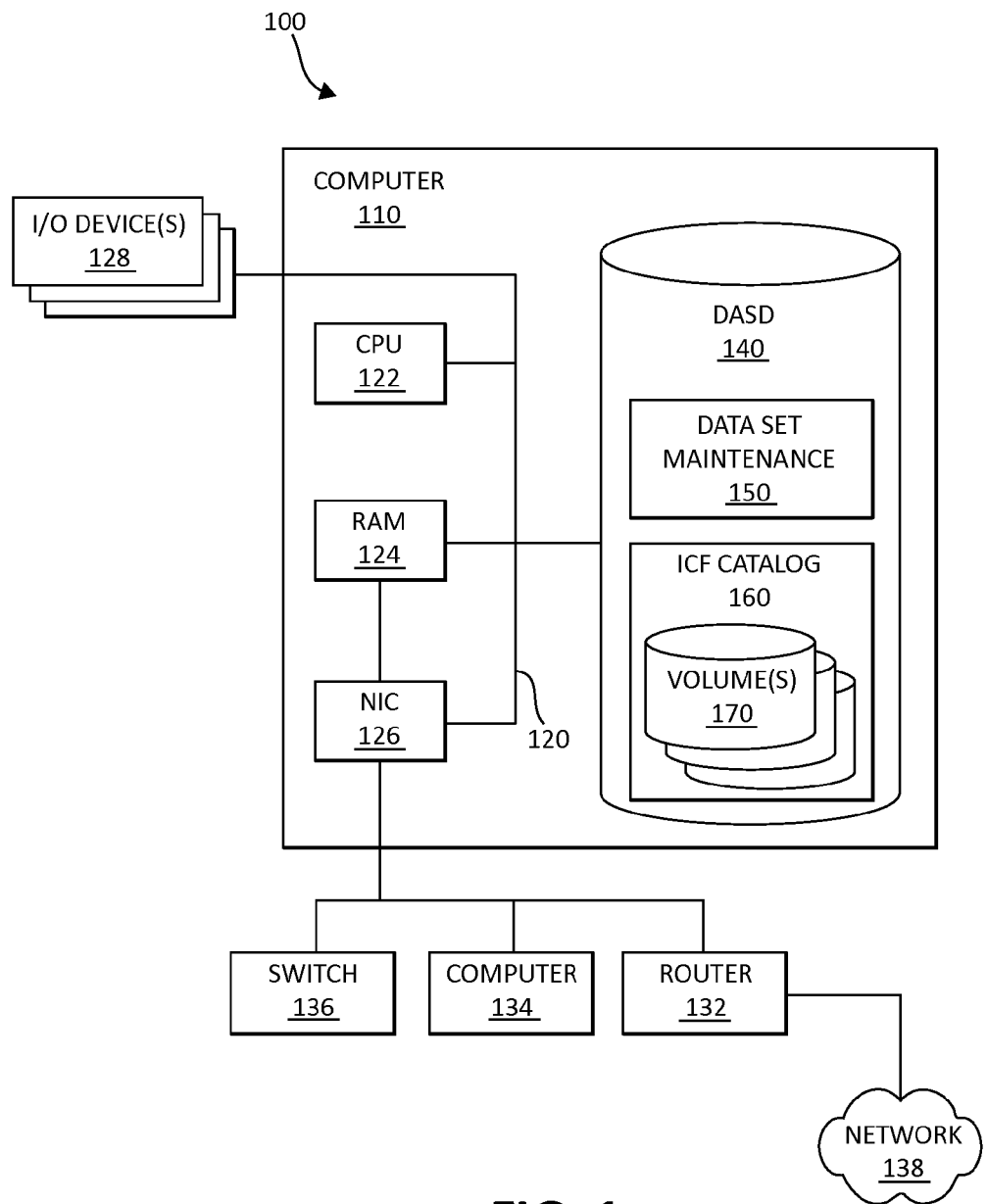
FIG. 1 is an exemplary computing environment.

FIG. 1 depicts one embodiment of a computer system for optimizing defragmentation operations in accordance with the present invention. The computer system 100 includes a mainframe computer 110, a system bus 120, a central processing unit (CPU) 122, a random access memory (RAM) 124, a network interface card (NIC) 126, input/output (I/O) devices 128, a network 130, a router 132, a computer 134, a switch 136, the Internet 138, a direct access storage device (DASD) 140, a data set recovery resource 150, an integrated catalog facility (ICF) catalog 160, and one or more volumes 170.

The depicted computer 110 houses the system bus 120. The system bus 120 may provide a communication link among components within the mainframe computer 110 such as the CPU 122, the RAM 124, the NIC 126, and the DASD 140. In one embodiment, the CPU processes and transmits data received over the system bus 120 from and to components connected to the system bus 120. The system bus 120 may provide a communication link to peripheral devices such as I/O devices 128.

The I/O devices 128 may communicate with the mainframe computer 110 via the system bus 120. The I/O devices 128 may provide a communication channel from the computer 110 to a user. Each I/O device 128 may individually include a monitor, a keyboard, a mouse, or the like.

The network interface card 126 may communicate with devices external to the mainframe computer 110 via the network 130. In one embodiment, the network interface card 126 provides a communication link between the system bus 120 and the network 130, thus allowing the computer 110 to communicate with devices on the network 130. Such devices may comprise the computer 134, the switch 136, or the router 132. The computer 134 may be another computer 110, a workstation, a server, or the like. The router 124 may have a connection from the network 130 to the Internet 138.

The depicted DASD 140 may reside as a component in the mainframe computer 110. In one embodiment, the DASD 140 stores part of the data set recovery resource 150. In the depicted embodiment, the data set recovery resource 150 is housed entirely within the DASD 140. The DASD 140 may also store part of the ICF catalog 160. In the depicted embodiment, the ICF catalog 160 is housed entirely within the DASD 140. The ICF catalog 160 may comprise volumes 170. Volumes 170 may comprise data regarding data sets (i.e., metadata) as well the data sets themselves.

The ICF catalog 160 stores information about other data sets. In one embodiment, the ICF catalog 160 is a data set storing information about other data sets. This information may include data set attributes as well as data set locations to facilitate retrieving a desired data set only by name without requiring a user to specify the data set's location.

Figure 2:
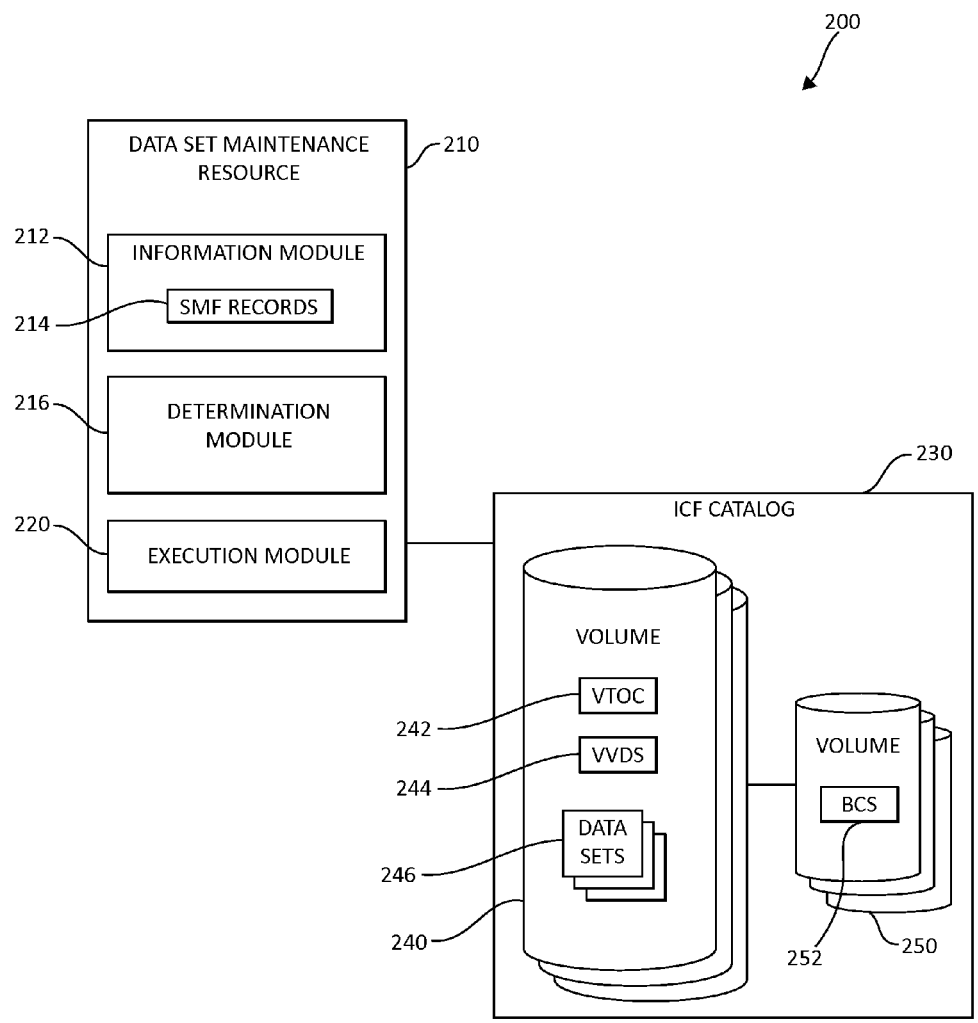
FIG. 2 is an exemplary defragmentation resource.

FIG. 2 depicts one embodiment of a DASD environment comprising a data set maintenance resource and an integrated catalog facility (ICF) catalog in accordance with the present invention. The DASD environment 200 includes a data set maintenance resource 210, an information module 212, system management facility (SMF) records 214, a determination module 216, and an execution module 220. ICF catalog 230 includes a volume 240, a volume table of contents (VTOC) 242, a VSAM volume data set (VVDS) 244, data sets 246, diagnostic data set components 248 associated with the data sets 246, a volume 250, and a basic catalog structure (BCS) 252.

Data sets 246 are collections of logically related data records. Data sets 246 may include both VSAM and non-VSAM data sets. Virtual storage access method (VSAM) is an IBM® disk file storage scheme used in mainframe computer operating systems. The VSAM storage scheme has been implemented throughout operating systems utilizing the MVS (Multiple Virtual Storage) architecture. The MVS architecture originated in the MVS 24-bit IBM® operating system, which has evolved into the present z/OS® 64-bit IBM® operating system.

The VVDS 244 may be considered an extension of the VTOC 242. The VVDS 244 may store information about VSAM and non-VSAM data sets. Information not stored in the VTOC 242 may be stored in the VVDS 244 such as VSAM data set attributes, VSAM data set catalog name, and non-VSAM data set catalog name.

The BCS 252 may be used by the data set maintenance resource 210 to obtain information regarding data sets 246. The information that may be stored on the BCS 252 is a volume the data set resides on, a data set type, a data set association, and ownership of the data set. In one embodiment, the BCS 252 points to multiple VSAM Volume Data Sets and, consequently, to multiple Volume Table of Contents. The relationship between the BCS 252, VVDS 244, and VTOC 242 is not exclusive.

In the depicted embodiment, the data set maintenance resource 210 includes the information module 212, the determination module 216, and the execution module 220. The data set maintenance resource 210 may execute the preceding modules. In one embodiment, the data set maintenance resource 210 receives control statements from a director. A director may be a person, process, or application configured to provide a set of control statements. Control statements are a set of commands for the computer system. One example of control statements are Job Control Language (JCL) control statements. These statements identify the user, indicate what processes are to be run, what resources are required, and what priority to allocate to the job. The data set maintenance resource 210, in one embodiment, facilitates the analysis and scheduling of data according to aspects of the present invention, as will be further illustrated.

The information module 212 may retrieve information regarding data sets 246 on a volume 240 from the VTOC 242. The information retrieved by the information module 212 may include identification of one or more designated volumes. In one embodiment, control statements from the director are examined by the information module 212 to identify the designated volume. Control statements may be used to identify a function to be performed by a selected program or utility. Control statements may also be used to identify specific volumes or data sets to be maintained or processed. Other information retrieved by the information module may include a data set name, catalog status, the type entry in the catalog such as the type of data set or the VSAM index of a VSAM data set, or associated data set names if applicable.

The information module 212 includes SMF records 214 in a data repository for tracking such actions as opening a file, closing a file, and catalog updates of VSAM data sets. The information module 212 may examine SMF records 214 as will be further described to analyze usage patterns in the data over a predetermined period of time. Other information retrieved by the information module may include a data set name, catalog status, the type entry in the catalog such as the type of data set or the VSAM index of a VSAM data set, or associated data set names if applicable.

In the depicted embodiment, the determination module 214 determines one or more data set operations to perform. The determination module 214 may examine VTOC and/or VVDS information, including data set-specific diagnostic information to determine one or more operations to perform, such as operations pursuant to allocating a data set to a particular job or storage resource as one of ordinary skill in the art will appreciate.

The execution module 220 executes the one or more generated control statements to perform various operations on the data sets 246. The execution module may be adapted to execute scheduling operations pursuant to a usage schedule, as will be further described.

The ICF catalog 230 may include the volumes 240 and 250. In the depicted embodiment, volume 240 includes the VTOC 242, the VSAM volume data set (VVDS) 244 and the data sets 246. Also in the depicted embodiment, volume 250 includes the basic catalog structure (BCS) 252. In the depicted embodiment, both the ICF catalog 230 and the data set recovery resource 210 reside on the DASD 140.

One or more of the information module 212, determination module 216, and execution module 220 may be adapted to perform various jobs and operations to implement various aspects of the present invention. In one exemplary embodiment a DEFRAG job is adapted to serialize the VTOC 242 only for a volume scan operation to identify areas to be moved and those that do not need to be moved. A computation is made to determine which area of the pack will be used as a new target area. As a following step, several dummy data sets are allocated across the volume to be used during the DEFRAG as a reservation system while other data sets are moved into those locations. At this point, serialization on the VTOC is released, allowing other jobs to access the VTOC 242. The VTOC can be updated since those data sets we are moving already have target space reserved and are exclusively ENQ'd, which prevents those particular data sets from being accessed.

As a following step, regular input/output (I/O) operations are allowed to take place. These operations may be point-in-time copies, standard host I/O, or other data transfer as one of ordinary skill in the art will appreciate. After a data set move pursuant to the DEFRAG job is completed, the dummy information in the VTOC is updated with the correct information of the data set that has been moved. The prior location of the moved data set is then marked as free space, and is usable for extends or new allocations, for example. A subsequent step may be to again serialize the VTOC 242 and again analyze the volume. If the fragmentation level is still too high (for example, exceeds a user-specified fragmentation index), then additional dummy set(s) may be created and the steps discussed previously may repeat until the fragmentation level has reached an acceptable threshold.

One advantage of the aforementioned DEFRAG methodology is that after each analysis phase, the volume is available for new allocations. If those new allocations somehow cause additional fragmentation, the next pass of processing includes a subsequent analysis phase, so that fragmentation will be corrected. As volume sizes increase in data storage facilities, the amount of time that the VTOC 242 is locked from access has an increasing impact. Accordingly, various aspects of the illustrated embodiments allow for time periods where the VTOC 242 may be safely used. In one example, if a particular point-in-time copy regime cannot be used on a larger storage volume during a DEFRAG job, the periods of allowed I/O (while the VTOC 242 is released from serialization) may be substantial. These are the periods of time in which the VTOC 242 is freely accessible. At the end of each respective analysis period (in which the applicable storage volume is analyzed for files to defragment), applications and users are able to access the VTOC (during the subsequent I/O period), thus providing windows where jobs and work can be completed, rather than waiting for the entire DEFRAG job to complete.

In an additional embodiment, a determination may be made as to an amount of free space available on the volume. Subsequently, only a certain percentage of that free space may be utilized during each pass (scan/analyze, remove serialization, allow I/O). The reserved dummy data sets may only be allowed to use the predetermined percentage of free space, such that users may add new allocations to the volume while an applicable DEFRAG job is taking place during the periods when the VTOC serialization is released. The default free space to be left unused, in one embodiment, may constitute approximately 20% of the volume's total free space. This amount may be adjusted by the user.

Figure 3:
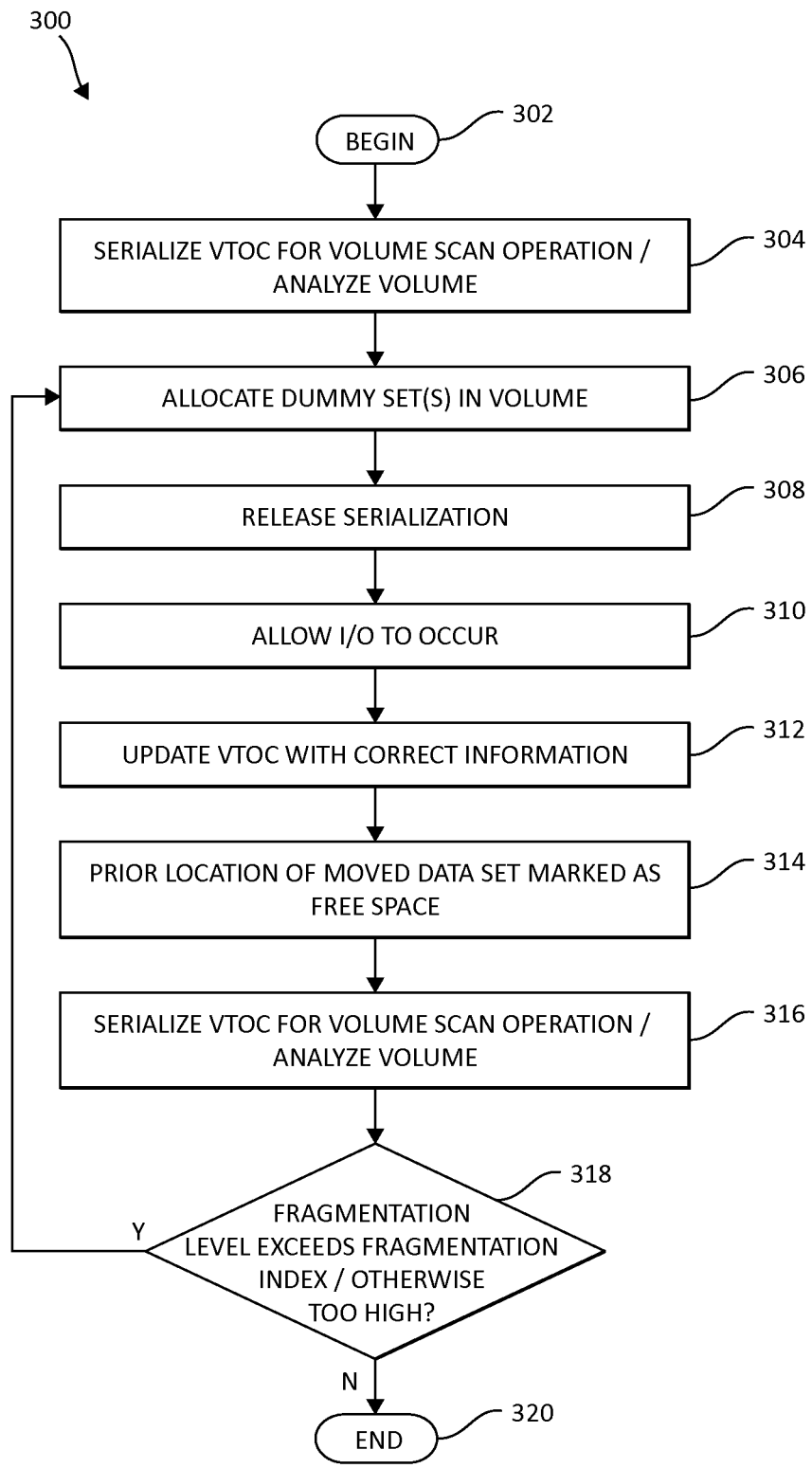
FIG. 3 is an exemplary method for optimizing data defragmentation operations in a computing storage environment in which various aspects of the illustrated embodiments and following claimed subject matter may be implemented.

Turning now to FIG. 3, a logic flow diagram of an exemplary method 300 for optimizing defragmentation in a computing storage environment is depicted. As one skilled in the art will appreciate, the described method may be implemented by various means, such as hardware, software, firmware, or a combination thereof operational on or otherwise associated with the computing storage environment. For example, the method 300 may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums. The method 300 may be carried out by various components of the data set maintenance resource 210 (FIG. 2), as previously described, such as by various data set modules.

Method 300 begins a respective DEFRAG job (step 302) by serializing the applicable VTOC for a volume scan operation (step 304). Pursuant to this volume scan operation, the volume is analyzed to determine which files need movement, for example. As a following step, the corresponding dummy data set(s) are allocated in the volume (step 306). The serialization of the VTOC is released (step 308). Following release of the VTOC serialization, I/O is then allowed to occur (step 310). Pursuant to this I/O, the VTOC is accessible, and data movement occurs to replace the various dummy data sets with actual data.

As a following step, the VTOC is then updated with the correct location of the files that have been moved (step 312). The prior location of the moved data set is marked as free space (step 314). The VTOC is again serialized for an additional volume scan operation, and the volume is again analyzed for files needing movement (step 316). If the fragmentation level exceeds a fragmentation index, or is otherwise too high (step 318), the method 300 then ends (step 320).

Returning to step 318, if the fragmentation levels are too high, the method 300 moves to step 306 to perform another series of operations (analysis, deserialization, allowance of I/O) as seen in step 308-316. The method 300 continues such steps until fragmentation levels have been appropriately diminished.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for defragmentation of a storage volume in a computing storage environment by a processor device, comprising:
    serializing a volume table of contents (VTOC) for a volume scan operation;
    allocating at least one dummy data set in the storage volume to be subsequently filled with actual data pursuant to a defragmentation operation; and
    allowing input/output (I/O) operations to occur.

2. The method of claim 1, further including releasing the serialization of the VTOC, allowing access to the storage volume.

3. The method of claim 1, further including performing the volume scan operation to identify at least one source location and at least one target location for data movement.

4. The method of claim 3, further including, pursuant to allowing I/O operations to occur, updating the VTOC to reflect the target location of the data movement.

5. The method of claim 4, further including, subsequent to allowing the I/O operations to occur, marking the at least one source location as free space.

6. The method of claim 1, further including subsequent to allowing I/O operations to occur, performing an additional volume scan operation.

7. The method of claim 6, further including subsequent to performing the additional volume scan operation, performing at least one of:
    allocating at least one additional dummy data set in the storage volume to be subsequently filled with actual data pursuant to an additional defragmentation operation,
    re-releasing the serialization of the VTOC, again allowing access to the storage volume, and
    re-allowing input/output (I/O) operations to occur.

8. A system for defragmentation of a storage volume in a computing storage environment, comprising:
    at least one processor device, operable in the computing storage environment, wherein the at least one processor device:
    serializes a volume table of contents (VTOC) for a volume scan operation,
    allocates at least one dummy data set in the storage volume to be subsequently filled with actual data pursuant to a defragmentation operation, and
    allows input/output (I/O) operations to occur.

9. The system of claim 8, wherein the at least one processor device releases the serialization of the VTOC, allowing access to the storage volume.

10. The system of claim 8, wherein the at least one processor device performs the volume scan operation to identify at least one source location and at least one target location for data movement.

11. The system of claim 10, wherein the at least one processor device, pursuant to allowing I/O operations to occur, updates the VTOC to reflect the target location of the data movement.

12. The system of claim 11, wherein the at least one processor device, subsequent to allowing the I/O operations to occur, marks the at least one source location as free space.

13. The system of claim 8, wherein the at least one processor device, subsequent to allowing I/O operations to occur, performs an additional volume scan operation.

14. The system of claim 13, wherein the at least one processor device, subsequent to performing the additional volume scan operation, performs at least one of:

allocating at least one additional dummy data set in the storage volume to be subsequently filled with actual data pursuant to an additional defragmentation operation, re-releasing the serialization of the VTOC, again allowing access to the storage volume, and re-allowing input/output (I/O) operations to occur.

15. The system of claim 8, wherein the at least one processor device is a storage management processor (SMP).

16. The system of claim 8, wherein the I/O operations include a point-in-time copy operation.

17. A computer program product for defragmentation of a storage volume in a computing storage environment by a processor device, the computer program product comprising a non-transitory computer-readable storage medium having computer-readable program code portions stored therein, the computer-readable program code portions comprising:

a first executable portion that serializes a volume table of contents (VTOC) for a volume scan operation;

a second executable portion that allocates at least one dummy data set in the storage volume to be subsequently filled with actual data pursuant to a defragmentation operation; and a third executable that allows input/output (I/O) operations to occur.

18. The computer program product of claim 15, further including a fourth executable portion that releases the serialization of the VTOC, allowing access to the storage volume.

19. The computer program product of claim 15, further including a fourth executable portion that performs the volume scan operation to identify at least one source location and at least one target location for data movement.

20. The computer program product of claim 17, further including a fifth executable portion that, pursuant to allowing I/O operations to occur, updates the VTOC to reflect the target location of the data movement.

21. The computer program product of claim 19, further including a sixth executable portion that, subsequent to allowing the I/O operations to occur, marks the at least one source location as free space.

22. The computer program product of claim 15, further including a fourth executable portion that, subsequent to allowing I/O operations to occur, performs an additional volume scan operation.

23. The computer program product of claim 20, further including a fifth executable portion that, subsequent to performing the additional volume scan operation, performs at least one of allocating at least one additional dummy data set in the storage volume to be subsequently filled with actual data pursuant to an additional defragmentation operation, re-releasing the serialization of the VTOC, again allowing access to the storage volume, and re-allowing input/output (I/O) operations to occur.

* * * * *